United States Patent [19]

Fogal, Sr. et al.

[11] Patent Number: 5,479,975

[45] Date of Patent: Jan. 2, 1996

[54] TIRE VALVE STEM

[75] Inventors: Robert Fogal, Sr., Chambersburg, Pa.; John Hall, Salem, Ohio

[73] Assignee: International Marketing, Inc., Chambersburg, Pa.

[21] Appl. No.: 344,557

[22] Filed: Nov. 23, 1994

[51] Int. Cl.$^6$ .............................. B60C 29/04; F16K 51/00
[52] U.S. Cl. .................... 152/429; 152/427; 152/DIG. 5; 152/503; 137/223
[58] Field of Search ...................... 152/427, 429, 152/DIG. 5, 503; 137/223; 210/429, 432

[56] References Cited

U.S. PATENT DOCUMENTS

| | | | |
|---|---|---|---|
| 462,013 | 10/1891 | Moseley et al. | 152/428 |
| 499,174 | 6/1893 | Phelps | 152/503 |
| 1,671,306 | 5/1928 | Mincher | 264/257 |
| 1,738,927 | 12/1929 | Salerni | 152/427 |
| 1,896,708 | 2/1933 | Jones | 137/232 |
| 3,628,585 | 12/1971 | Pace | 152/504 X |
| 3,823,831 | 7/1974 | LeBlanc, Jr. | 210/429 X |
| 4,216,812 | 8/1980 | Bourne | 152/504 |
| 4,440,208 | 4/1984 | Trickel et al. | 152/314 |
| 4,651,792 | 3/1987 | Taylor | 152/415 |
| 4,734,194 | 3/1988 | Kalman et al. | 210/429 X |
| 4,987,937 | 1/1991 | Nowicke | 152/400 |
| 5,073,217 | 12/1991 | Fogal | 156/75 |
| 5,181,977 | 1/1993 | Gneiding et al. | 152/429 |

*Primary Examiner*—Michael W. Ball
*Assistant Examiner*—Francis J. Lorin
*Attorney, Agent, or Firm*—Oldham & Oldham Co.

[57] ABSTRACT

The present invention relates generally to a valve stem for a pneumatic tire and more specifically to a valve stem which is capable of allowing for the introduction of pulverulent matter into the tire directly through the valve while at the same time also being capable of filtering the air released from within the tire through the valve core to prevent pulverulent matter contained within the tire from entering the valve core seat assembly and the atmosphere. The present invention also prevents pulverulent matter which may be contained within a tire from being forced into the valve core over time through use of the tire and due to routine checking of tire air pressure. The invention is suited for use with any size wheel and tire assembly including those found on automobiles, light trucks, heavy duty over-the-road trucks, and heavy duty off-road trucks.

16 Claims, 2 Drawing Sheets

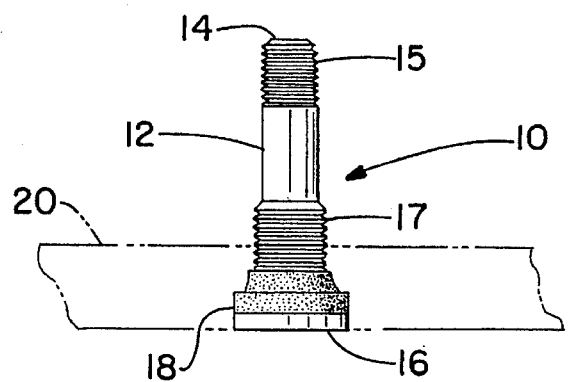
FIG.-1
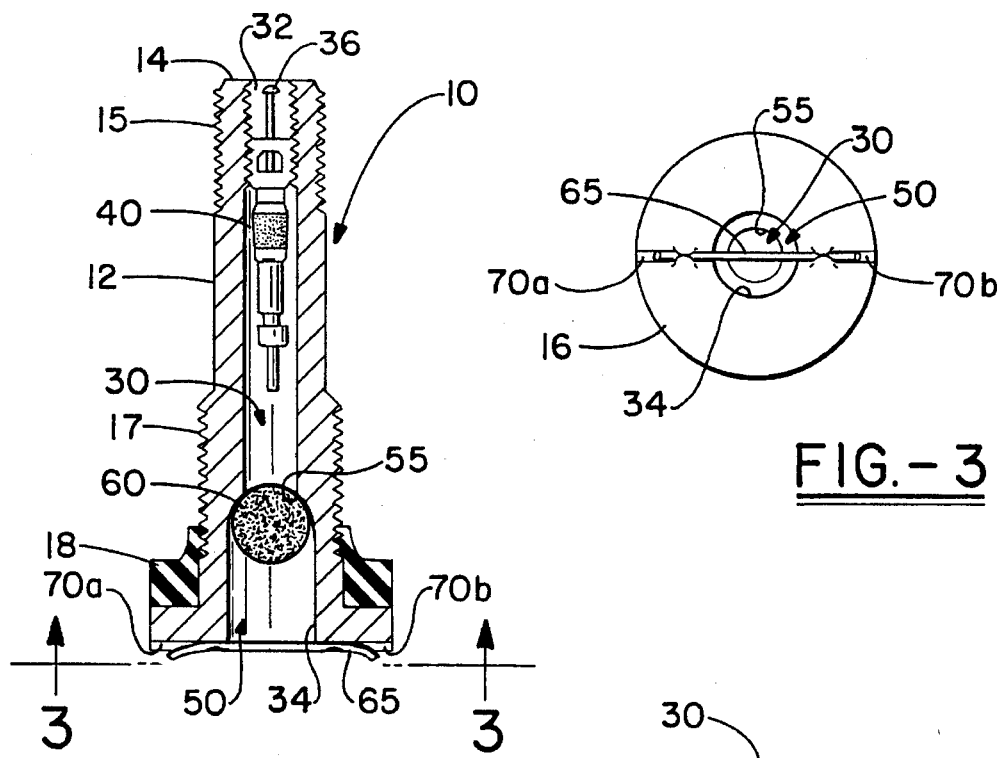
FIG.-2
FIG.-3
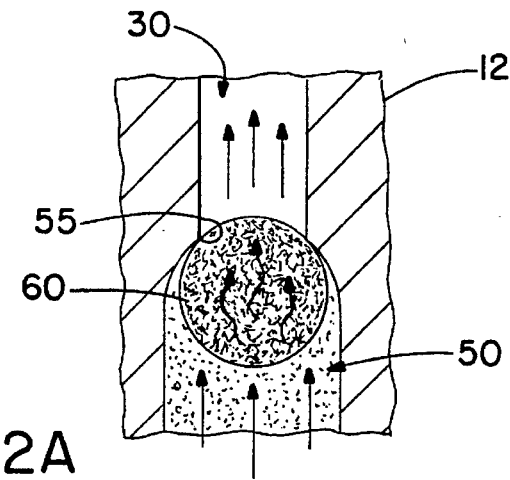
FIG.-2A

TIRE VALVE STEM

FIELD OF INVENTION

The present invention relates generally to a valve stem for a pneumatic tire and more specifically to a valve stem which is capable of allowing for the introduction of pulverulent matter into the tire directly through the valve while at the same time also being capable of filtering the air released from within the tire through the valve core to prevent pulverulent matter contained within the tire from entering the valve core seat assembly and the atmosphere. The present invention also prevents pulverulent matter which may be contained within a tire from being forced into the valve core over time through use of the tire and due to routine checking of tire air pressure.

BACKGROUND OF THE INVENTION

It is becoming increasingly popular to purposely introduce particulate or pulverulent matter into a tire to affect the tire characteristics. This application involves introducing a powder of specific composition into the tire to dynamically "balance" the tire and to reduce radial and lateral force variations found within a tire under varying load conditions. This method is taught and described in applicant's prior U.S. Pat. No. 5,073,217 and applicant's copending application Ser. No. 08/184,735, both of which are herein incorporated by reference. The particulate composition is sold by International Marketing, Inc. under the trademark "EQUAL®."

These various powders and substances may cause loss of air through the tire valve core, especially upon the checking of tire air pressure. The small size of the particles allows the particles to enter the valve core assembly and these particles may adversely affect the valve core components or their operation. Furthermore, it is desirable to prevent these installed substances from escaping the tire. By preventing the escape of the pulverulent powder, the powder does not enter the atmosphere and does not need to be replenished when the tire is re-inflated.

The EQUAL® tire balancing formula is often placed within new tires before the valve core is installed and before the tire is inflated. However, to introduce particulate compositions into an installed tire, it saves time and effort and is generally desirable to introduce such substances directly into a tire which already has a tire valve installed and which may already be partially or fully inflated. This is accomplished by introducing the powder or particulate matter directly into the valve under pressure such as in combination with compressed air to force the powder into the interior of the tire. A valve stem containing a simple screen or mesh to prevent valve core blockage upon tire air pressure checks does not allow such particulate matter to be introduced into the valve core seat because the screen or mesh blocks the particulate matter.

Also, it is not uncommon for a tire to contain other particulate matter such as dust, dirt, and as a consequence of use whereby particles of rubber become dislodged from the interior bead of the tire and freely move about the interior of the tire when the tire is in use. Over time, a large number of such particles may be found in any tire. It is not uncommon for these particles to enter into the tire valve core and prevent the valve from fully closing resulting in an air leak. This is especially likely to occur when air is released from the tire as the flow of air exiting the valve naturally draws the particles into the valve core.

SUMMARY OF THE INVENTION

The present invention is therefore directed to a tire valve specially designed to allow the relatively unimpeded flow of compressed air or a combination of compressed air and pulverulent matter into a tire while at the same time being capable of preventing any particulate or pulverulent matter contained within a tire from entering the tire valve core as is especially likely to occur when compressed air contained within the tire is vented through the valve core. The invention comprises an elongated valve body having a first end, a second end, and including a passageway formed therein, said passageway extending from said first end of said valve body to said second end of said valve body and said passageway defining an inlet port at said first end of said valve body for communication with a source of compressed air, and defining an outlet port at said second end of said valve body for communication with the interior of a tire; valve means disposed within said passageway for selectively blocking the flow of air through said passageway; a filter chamber, formed in fluid communication with said passageway between said first end and said second end of said passageway, said filter chamber having an upper region and a lower region wherein said upper region defines a filter seat; a filter element smaller in cross-sectional size relative to said filter chamber and disposed in an unbiased state within said filter chamber, said filter element capable of forming a selective seal with said filter seat to substantially preclude the passage of particulate matter when said filter element is forced adjacent to said filter seat; and, means for preventing said filter element from exiting said lower region of said filter chamber. The valve may be sized and configured for use with automobiles or light trucks, or it may be sized and configured for use with heavy duty trucks.

BRIEF DESCRIPTION OF THE DRAWINGS

FIG. 1 is an elevational view showing the valve of the present invention as it may be installed in a wheel rim (the rim shown in ghost lines);

FIG. 2 is an enlarged elevational longitudinal cross-section of the present invention;

FIG. 2A is a greatly enlarged partial sectional view illustrating the valve operation as may occur when pressurized air contained within a tire is vented through valve;

FIG. 3 is a plan view as it may be taken at line 3—3 of FIG. 2; and

DETAILED DESCRIPTION OF THE PREFERRED EMBODIMENT

Figure 4:
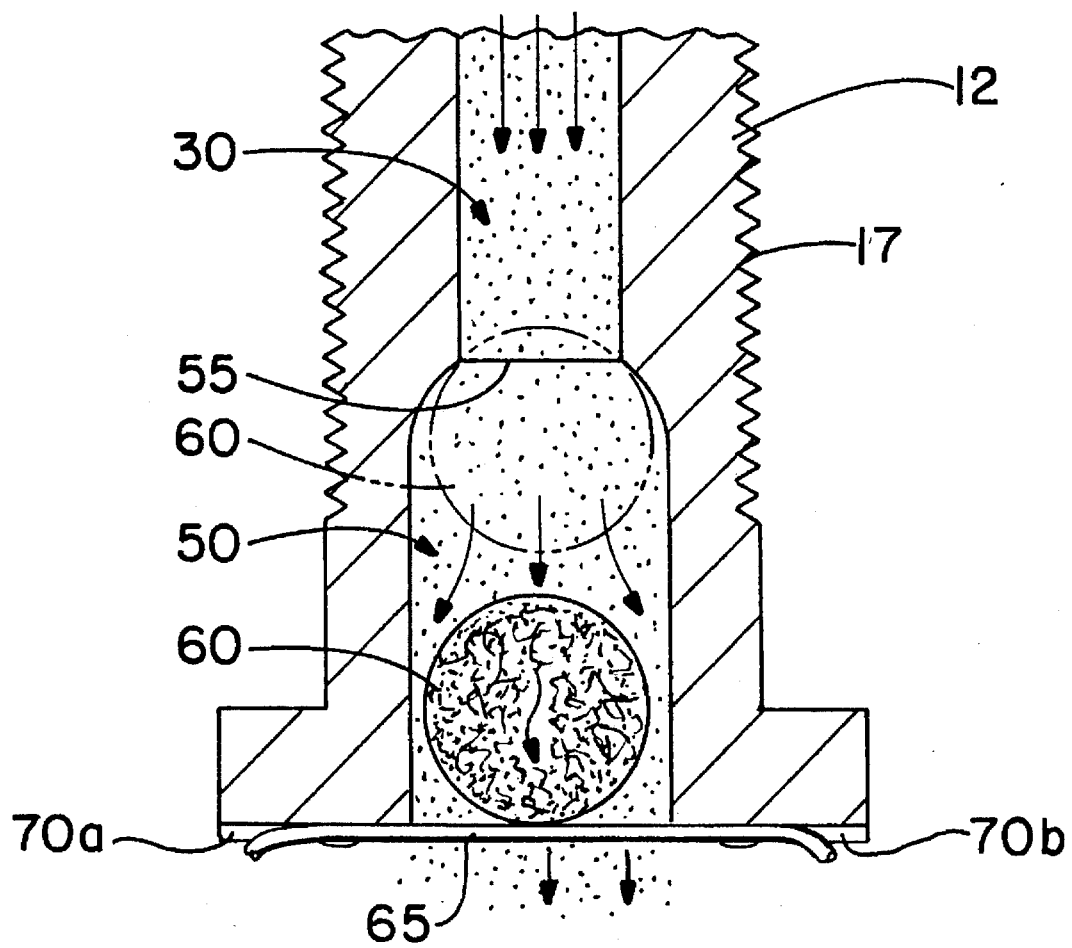
FIG. 4 is a greatly enlarged partial sectional view illustrating the operation of the valve as may occur when particulate matter is introduced into the valve in combination with compressed air.

Reference will now be made in detail to the preferred embodiment of the present invention which is illustrated in the accompanying drawings. Referring to FIG. 1, the invention is shown generally at 10 and comprises an elongated valve body 12 having a first end 14 and a second end 16. First end 14 may contain external threads 15 to allow for the attachment of a protective cap or to allow for the attachment of a mating pneumatic fitting. Additional external threads 17 may be provided along the valve body to allow for attachment of valve body to wheel rim 20 using a nut (not shown). Second end 16 preferably contains an annular rubber seal 18 to provide for an airtight seal between second end 16 of valve body 12 and wheel rim 20. Many shapes and sizes and varieties of valve bodies are known in the art and the present invention is not meant to be limited to any particular valve body or any particular method of attachment with wheel rim 20. In particular, those skilled in the art will recognize that the disclosure and figures may apply equally to a valve sized and configured for use with automobile and light truck tires, as well a valve sized and configured for use with tires and wheels of heavy duty over-the-road and off-road trucks.

As seen in FIG. 2, a central passageway or bore 30 extends from first end 14 to second end 16 of valve body 12 Passageway 30 defines an inlet port 32 at first end 14 of valve body, and defines an outlet port 34 at second end 16 of valve body 12. Valve means which is preferably a pneumatic valve or valve core 40 is disposed in passageway 30. Valve core 40 is threadably secured at or near first end 14 of passageway 30 and depends from first end 14 into passageway. Valve pin 36 is biased by means of a spring to extend into inlet port 32 to be capable of being depressed by a mating pneumatic fitting or other implement as is known in the art to open valve core 40 to allow air to pass through passageway 30. It should again be noted that many such valve cores are known in the art, one such valve core being made by Schrader Automotive, Inc., Charlotte, N.C., and being commonly known in the industry as a Schrader Valve. The invention however is not meant to be limited to any particular type of valve core.

A filter chamber 50 is provided in fluid communication with passageway 30 and includes an upper portion or region defining a filter seat 55. In the preferred embodiment, outlet port 34 of passageway 30 defines the lower portion or region of filter chamber 50. Filter chamber 50 may be formed in communication with passageway 30 at any point along passageway 30 however is preferably formed between valve core 40 and outlet port 34 of passageway 30. Filter chamber 50 is preferably larger in cross-sectional diameter than passageway 30.

A filter element 60, which in the preferred embodiment is spherical in shape, is disposed in an unbiased manner within chamber 50. The spherical shape of filter element 60 is preferable because it allows filter element 60 to act similar to a ball check valve to form a selective seal with filter seat 55. Filter element 60 is smaller in cross-sectional size than filter chamber and in the preferred embodiment is made from sintered bronze although other suitable filtering materials as are known in the art may be employed. For example, filter element 60 may be formed of sintered stainless steel, sintered magnesium, sintered manganese, and other sintered metals formed using known powdered metallurgical techniques. In addition various nonmetallic filter media are well known in the art and are suitable for use with the present invention. Filter element 60 should allow for the passage of air but be substantially impervious to pulverulent matter. Cross-sectional size of filter element 60 should be small enough relative to the cross-sectional size of the filter chamber 50 to allow pulverulent material introduced into valve 10 through inlet port 32 to pass between walls of filter chamber 50 and filter element 60 when filter element 60 is unseated relative to filter seat 55.

As an alternative embodiment, filter chamber 50 may be frusto-conical in shape being of smaller cross-sectional diameter at its upper region and of larger cross-sectional diameter at its lower region. In such an embodiment, filter element 60 could be spherical or could be conical or frusto-conical. Filter element should be sufficiently small in cross-sectional size relative to filter chamber 50 to allow for the passage of pulverulent material between walls of filter chamber 50 and filter element 60 when filter is unseated relative to filter seat 55. However, in such an embodiment employing a frusto-conical filter chamber 50, and a conical or frusto-conical filter element 60, filter element 60 must be of sufficiently large dimensions such that filter element 60 does not tumble within chamber 50 and maintains the proper orientation relative to filter seat 55.

An occlusion means for preventing the escape of filter element 60 from lower portion of filter chamber 50 is shown in a preferred embodiment in FIGS. 2 and 3 as a wire 65 attached at opposite sides of outlet port 34 and spanning outlet port 34 to partially occlude or block the outlet port 34 of passageway 30. A first groove 70a and a second groove 70b may be disposed on opposite sides of outlet port 34 to accommodate wire 65. Subsequent to the placing of wire 65 in grooves 70a, 70b, grooves 70a, 70b may be deformed by means of a punch or otherwise to frictionally secure wire 65 therein. It is certainly recognized that wire 65 may be attached by numerous means known in the art and various occlusion means serving an equivalent purpose to wire 65 may be employed. One such equivalent occlusion means would involve forming the lower region of filter chamber 50, which in the preferred embodiment also functions as outlet port 34, to have an outer diameter which may be larger than the cross-sectional size of filter element, and an inner diameter smaller than the cross-sectional size of filter element 60 and having a perimeter of a shape which does not correspond to the shape of filter element 60. For example, lower region of filter chamber 50, which is preferably outlet port 34, could be formed having a serrated perimeter such that the teeth extend into outlet port 34 to provide an inner diameter (as measured between the points of opposing teeth) which confines filter element 60 while air and pulverulent material could pass through the gaps found between the teeth of the serrated perimeter.

In operation, the invention 10 is installed in a tire wheel rim 20 using the same methods as would be used to install a conventional tire valve stem. A tire is also mounted on rim 20. Filter element 60 is disposed in filter chamber 50 in an unbiased state and will only lie adjacent to filter seat 55 (FIG. 2 and FIG. 2A) if tire contains sufficient internal air pressure to force filter 60 adjacent to filter seat 55 or if gravity or other force such as centrifugal force pushes or pulls filter element 60 adjacent to filter seat 55. When valve pin 36 is depressed and compressed air is introduced into inlet port 32 as occurs when a tire is pressurized using methods known in the art, the pressure forces the filter element 60 away from filter seat 55 (FIG. 4) if it is not already naturally away from filter seat 55 and the compressed air and any pulverulent matter of sufficiently small size is allowed to enter the interior of tire through valve 10.

As seen in FIG. 4, a majority of the compressed air and any pulverulent matter contained within the stream of compressed air passes around the filter element 60 and between the filter element 60 and the walls of the filter chamber 50 to enter the tire through outlet port 34. A small amount of the compressed air introduced into inlet port 32 may pass through filter element 60 before entering the tire, although filter element 60 would deflect any pulverulent matter so that it travels around filter element 60. The small amount of compressed air which does travel through filter element 60 dislodges much of the particulate matter which may be contained on the surface of or within filter and in this manner, filter element is self-cleaning. If pulverulent matter is introduced into the tire through valve 10, it is desirable to subsequently introduce a short blast of compressed air free of any pulverulent matter into inlet port 32 to flush the valve stem passageway 30 of any residual pulverulent matter.

When tire is pressurized, forces, such as the internal air pressure of the tire, push or bias filter element 60 into upper region of filter chamber 50 and adjacent to filter seat 55. Other forces such as centrifugal force caused by the rolling of the tire and gravity, if the tire is at rest, may also force filter element 60 adjacent to filter seat 55. Filter element 60 forms a selective seal with filter seat 55 which substantially prevents the passage of pulverulent matter between filter element 60 and filter seat 55 although air may pass between filter element 60 and filter seat 55. Filter element 60 also does not allow for the passage of pulverulent matter but does allow the passage of air. In this manner, any pulverulent matter contained within tire or filter chamber 50 is prevented from passing into passageway 30 above filter chamber. This allows for air to be vented through inlet port 32 without any pulverulent matter contained within tire from entering valve core 40 or from exiting into the atmosphere.

In tires in which particulate compositions such as EQUAL® have not been installed, this invention also prevents any other particulate matter, such as dust, dirt, and small pieces of rubber which may be contained within the tire, from being forced into passageway and interfering with the flow of air or the operation of the valve core seat.

While the foregoing description has set forth the preferred embodiment of the invention in particular detail, it must be understood that numerous modifications, substitutions and changes can be undertaken without departing from the true spirit and scope of the present invention as defined by the ensuing claims.

What is claimed is:

1. A tire valve stem comprising:

an elongated valve body having a first end, a second end, and including a passageway formed therein, said passageway extending from said first end of said valve body to said second end of said valve body and said passageway defining an inlet port at said first end of said valve body for communication with a source of compressed air, and said passageway defining an outlet port at said second end of said valve body for communication with the interior of a tire;

valve means disposed within said passageway for selectively blocking the flow of air through said passageway;

a filter chamber, formed in fluid communication with said passageway between said first end and said second end of said passageway, said filter chamber having an upper region and a lower region wherein said upper region defines a filter seat;

a filter element smaller in cross-sectional size relative to said filter chamber and disposed in an unbiased state within said filter chamber, said filter element capable of forming a selective seal with said filter seat when said filter element is forced adjacent to said filter seat; and occlusion means for preventing said filter element from exiting said lower region of said filter chamber.

2. A tire valve stem as recited in claim 1, wherein said filter chamber is located between said valve means and said outlet port.

3. A tire valve stem as recited in claim 2, wherein said filter element is spherical in shape.

4. A tire valve stem as recited in claim 2, wherein said filter element is formed of a sintered metal.

5. A tire valve stem as recited in claim 3, wherein said filter element is formed of a sintered metal.

6. A tire valve stem as recited in claim 4, wherein said metal is bronze.

7. A tire valve stem as recited in claim 5, wherein said metal is bronze.

8. A tire valve stem as recited in claim 2, wherein said filter chamber is formed in said second end of said passageway such that said outlet port defines said lower region of said filter chamber.

9. A tire valve stem as recited in claim 8, wherein said filter element is spherical in shape.

10. A tire valve stem as recited in claim 8, wherein said filter element is formed of a sintered metal.

11. A tire valve stem as recited in claim 9, wherein said filter element is formed of sintered metal.

12. A tire valve stem as recited in claim 10, wherein said metal is bronze.

13. A tire valve stem as recited in claim 11, wherein said metal is bronze.

14. A tire valve stem as recited in claim 8, wherein said means for preventing said filter element from exiting said lower region of said filter chamber comprises at least one elongated member having a first end and a second end, said first and second ends of said at least one elongated member being disposed on opposite sides of said outlet port such that said at least one elongated member spans at least a portion of said outlet port to prevent exit of filter element from said filter chamber.

15. A tire valve stem as recited in claim 14, wherein said at least one elongated member is a wire.

16. A tire valve stem as recited in claim 15, further comprising an annular seal coaxially disposed about said second end elongated valve body.

\* \* \* \* \*